US010422197B2

(12) United States Patent
Herland et al.

(10) Patent No.: US 10,422,197 B2
(45) Date of Patent: Sep. 24, 2019

(54) ASYMETRICALLY CUTTING VALVE SEATS

(71) Applicant: Aker Solutions AS, Lysaker (NO)

(72) Inventors: Jan Herland, Nesbru (NO); Viktor Grennberg, Oslo (NO)

(73) Assignee: Aker Solutions AS, Lysaker (NO)

(*) Notice: Subject to any disclaimer, the term of this patent is extended or adjusted under 35 U.S.C. 154(b) by 0 days.

(21) Appl. No.: 15/034,230

(22) PCT Filed: Nov. 18, 2014

(86) PCT No.: PCT/NO2014/050214
§ 371 (c)(1),
(2) Date: May 4, 2016

(87) PCT Pub. No.: WO2015/072862
PCT Pub. Date: May 21, 2015

(65) Prior Publication Data
US 2016/0265301 A1 Sep. 15, 2016

(30) Foreign Application Priority Data
Nov. 18, 2013 (NO) .................................. 20131528

(51) Int. Cl.
E21B 33/06 (2006.01)
E21B 29/04 (2006.01)
(Continued)

(52) U.S. Cl.
CPC ............ E21B 33/063 (2013.01); E21B 29/04 (2013.01); E21B 33/06 (2013.01); E21B 34/02 (2013.01);
(Continued)

(58) Field of Classification Search
USPC ........................................... 251/1.1–1.3, 172
See application file for complete search history.

(56) References Cited

U.S. PATENT DOCUMENTS 3,972,507 A * 8/1976 Grove ................... F16K 3/0227
251/172
4,364,544 A * 12/1982 Kim ....................... F16K 3/0227
251/170
(Continued)

FOREIGN PATENT DOCUMENTS

GB         2352494 A        1/2001
GB         2352494 B        4/2003
WO     WO-2012093312 A1    7/2012

OTHER PUBLICATIONS

Thamir Jassim, Al-Amiri; "International Search Report" prepared for PCT/NO2014/050214 dated Feb. 6, 2015; 3 pages.

Primary Examiner — Jessica Cahill
Assistant Examiner — Daphne M Barry
(74) Attorney, Agent, or Firm — Winstead PC

(57) ABSTRACT

The invention provides a cutting valve comprising a valve block, a gate, which is slidably within a cavity in the valve block from an open position to a closing and cutting position, an upper seat arranged in an upper part of the valve between the valve block and the gate, and a lower seat arranged in a lower part of the valve between the valve block and the gate, The valve further comprises an upper resilient member arranged between the upper seat and a lower resilient member arranged between the valve block and the lower seat. The cutting valve being distinctive in that the combination of height of upper seat, and lower seat, resilient member and any spacers on the lower side of the gate is selected so that an allowed travelling distance for the upper seat towards the valve block and an allowed travelling distance for the lower seat towards the valve block, are substantially equal.

6 Claims, 12 Drawing Sheets

(51) Int. Cl.
*E21B 34/02* (2006.01)
*F16K 3/02* (2006.01)
*F16K 3/28* (2006.01)

(52) U.S. Cl.
CPC .............. *F16K 3/02* (2013.01); *F16K 3/0281* (2013.01); *F16K 3/28* (2013.01)

(56) References Cited

U.S. PATENT DOCUMENTS

| | | | |
|---|---|---|---|
| 5,803,431 A * | 9/1998 | Hoang | E21B 29/04 |
| | | | 251/326 |
| 2008/0017814 A1* | 1/2008 | Berckenhoff | E21B 33/061 |
| | | | 251/1.3 |
| 2008/0135791 A1* | 6/2008 | Juda | E21B 33/062 |
| | | | 251/1.3 |
| 2010/0102263 A1 | 4/2010 | Liew | |
| 2010/0155086 A1* | 6/2010 | Berckenhoff | E21B 33/072 |
| | | | 166/387 |
| 2012/0318528 A1* | 12/2012 | Wolfe | F16K 3/0263 |
| | | | 166/373 |
| 2013/0119288 A1 | 5/2013 | Shaw | |

\* cited by examiner

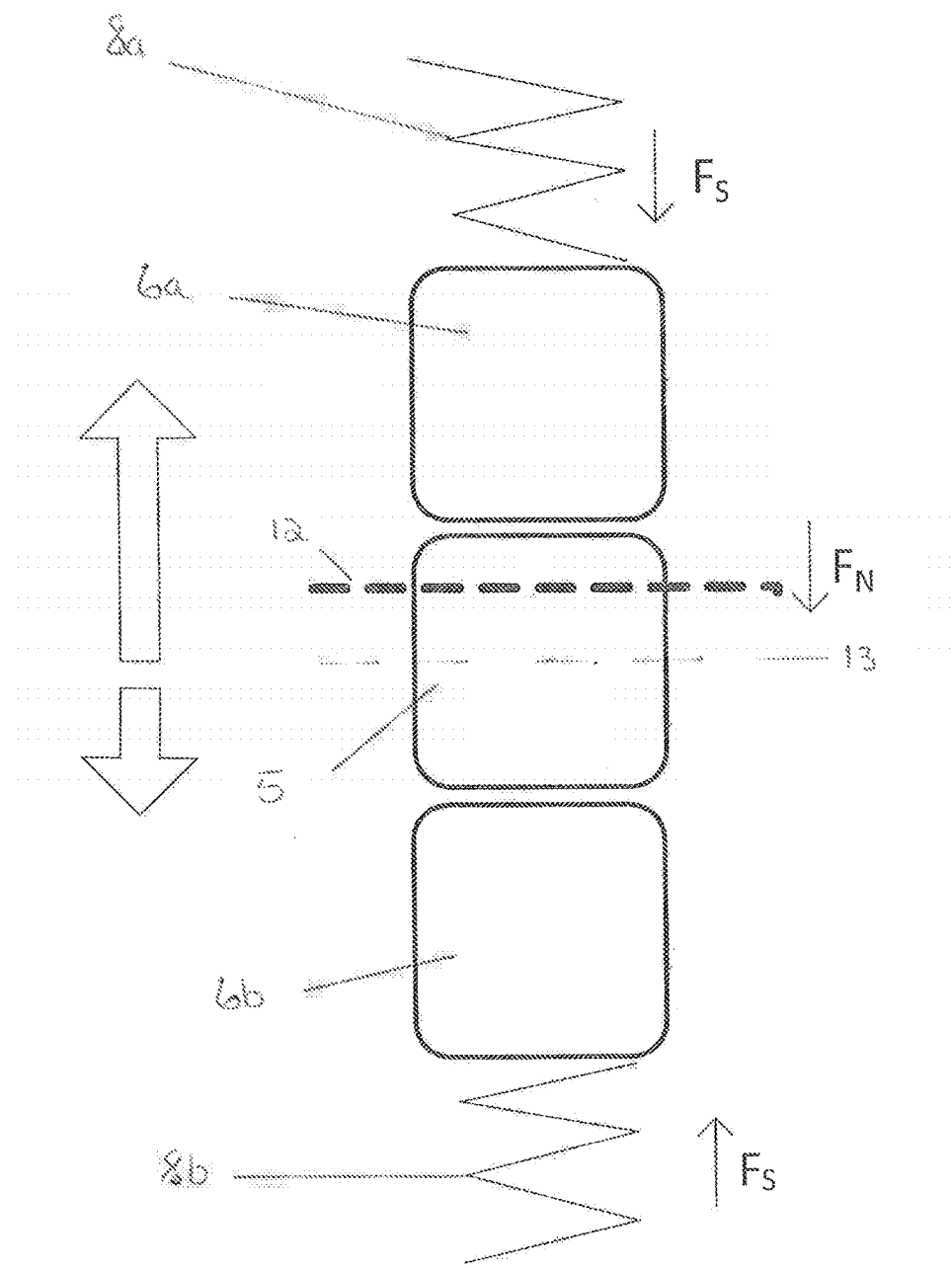
Figure 6a  Current Design

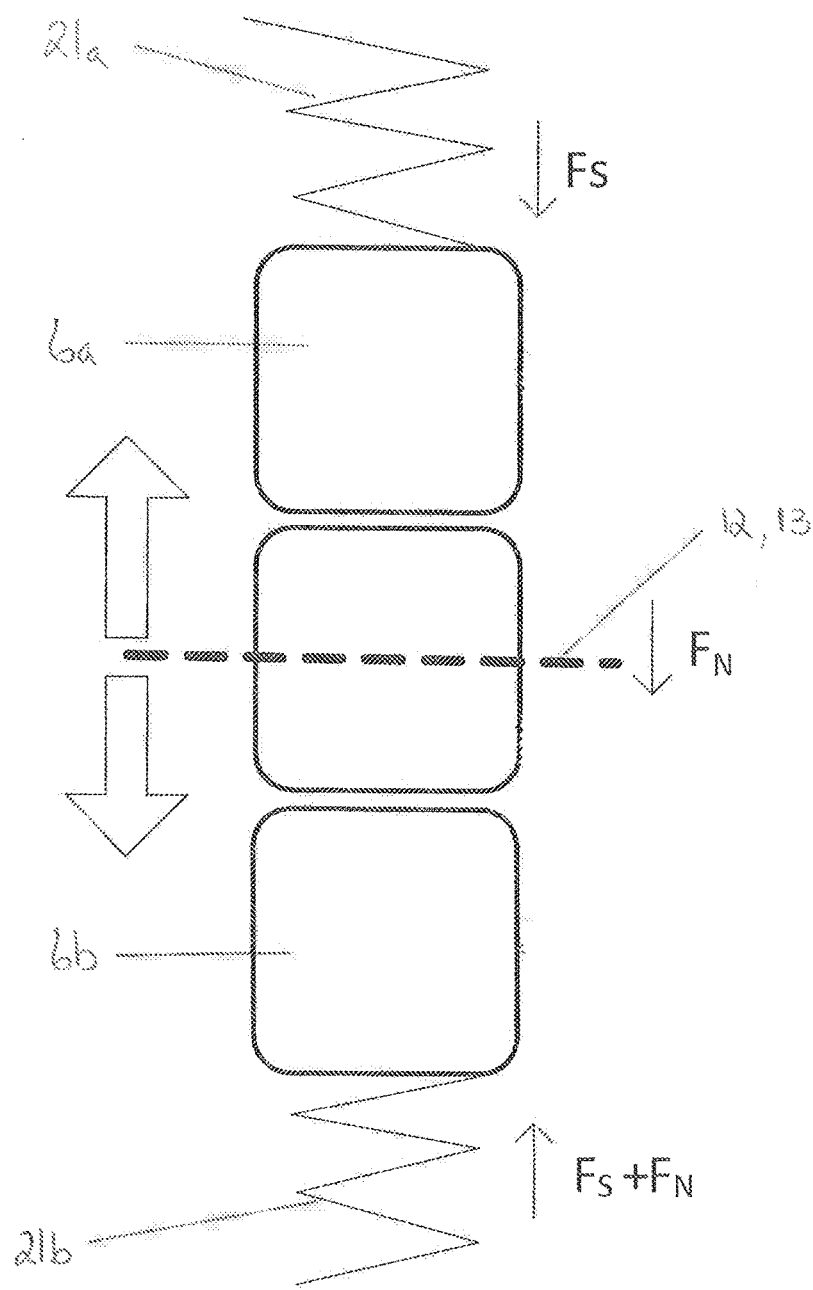
Figure 6b  Asymmetrical springs

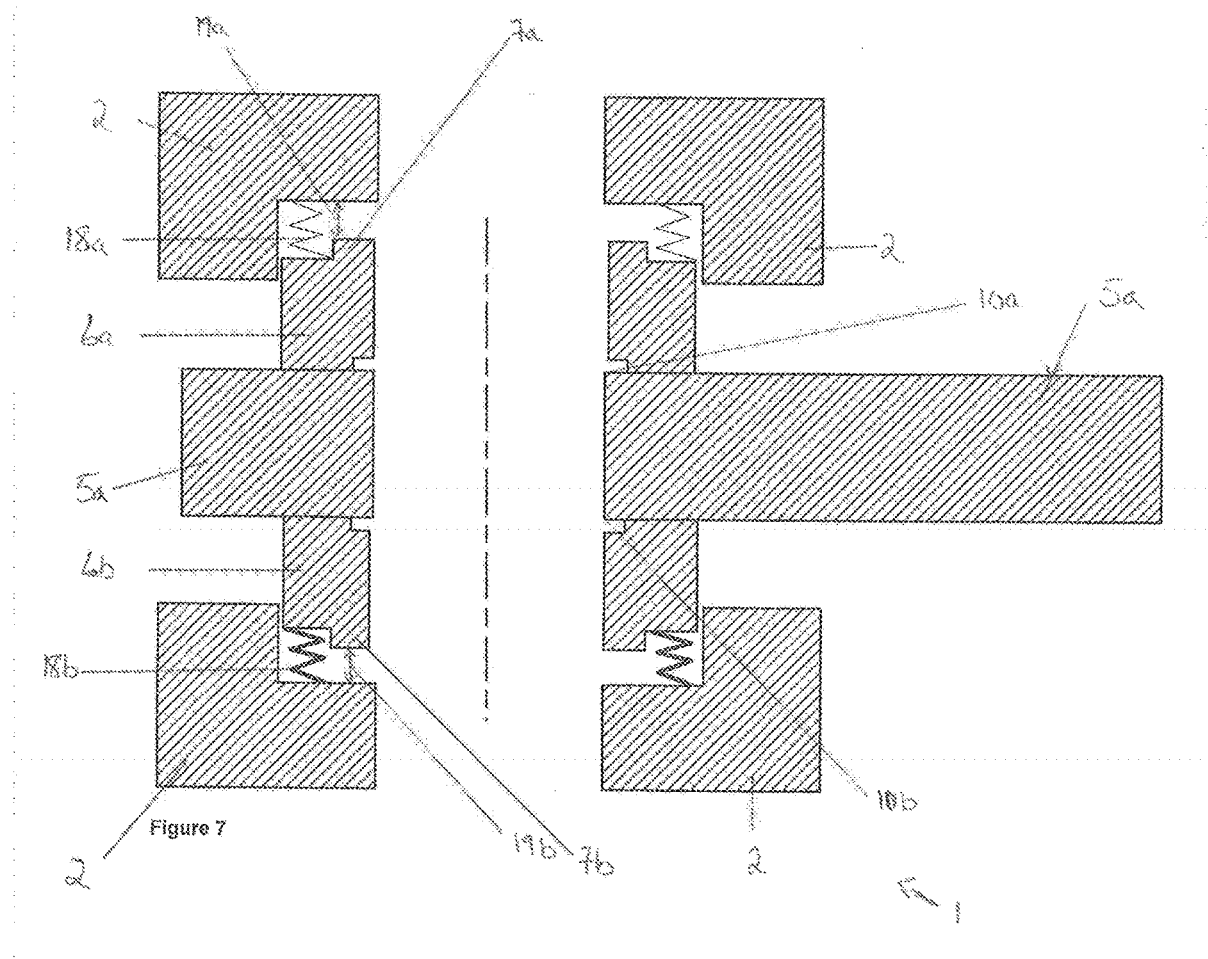

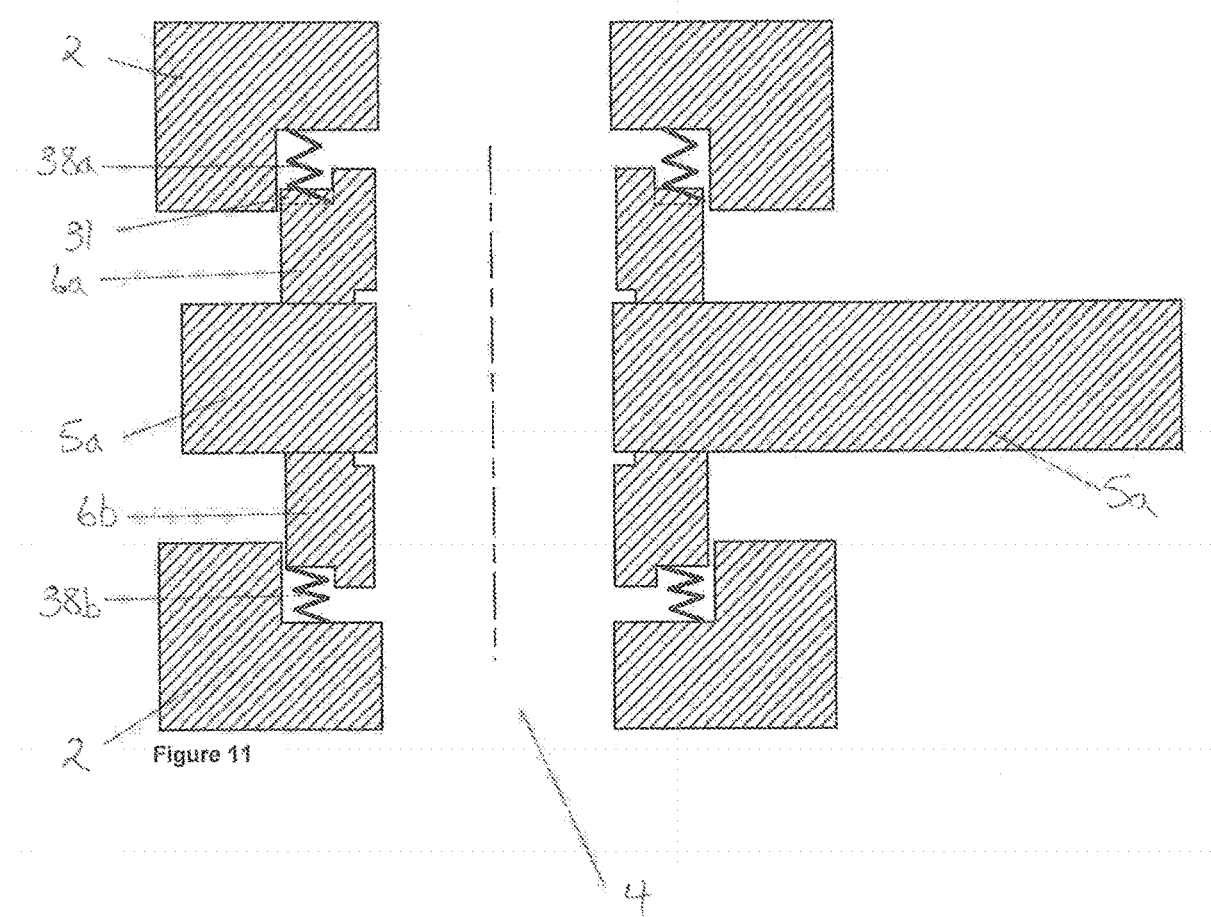

ASYMETRICALLY CUTTING VALVE SEATS

FIELD OF THE INVENTION

This invention relates to a cutting valve and in particular to a valve for use on oil wells which will cut a wire line and seal in the well under emergency conditions.

BACKGROUND OF THE INVENTION

During oil and gas production, and in particular during work-over or testing wells, wire line operations are common. Strings, for instance cables, lines, wires, coils or piano wires passes through the wellhead for supporting and manipulating various tools and instruments.

Ideally, the string is removed from the well before the gate valve is closing. However, in some situations, string removal prior to valve closure is not possible and the gate valve is closed on the string. Cutting valves having a wire passing through it should be capable of shearing the string while closing and maintaining a seal after the valve is seated.

It is important that the shearing efficiency of the cutting device is high in order to minimize the risk of dragging in wire strands between the upper seat and the gate. This can cause a leaky seal in the valve if the wire or strands is not sheared or cut off properly.

There has to be a clearance between the block and the seats to allow thermal expansion of the gate. While the valve is closing, the upper and lower seat retracts into a respective valve seat pocket. In prior art the cutting valve is symmetric about a centerline, this means that the seats, resilient members etc are equal at the upper side of the gate and at the lower side of the gate.

The weight of the gate is typically between 50-120 kg, gravity will pull the gate downward, and this may lead to large deviations between the centerline of the gate and the centerline of the cavity of the cutting valve and thus also a larger clearance between the upper seat and the valve block than the lower seat and the valve block. In the cutting position the upper seat is thus allowed to retract more than the lower seat, causing a larger clearance between the upper seat and the gate than between the lower seat and the gate. This is further explained below.

Typically braided wires with tough and thin strands, like coils, piano wires or other strings, consisting of a bundle of strands, do particularly represents a risk of dragging in parts of the strands between the clearance of the gate and the seats, causing a leaky seal.

It is inconvenient and difficult to change the cutting valve in the well, it is therefore necessary to install a cutting valve that can cut different types of objects such as cables, wires, strings, coils, piano wires etc in the well, efficiently.

US 20130119288 discloses a prior art cutting valve capable of shearing through any downhole tooling and maintain its seal capability after the shearing operation is complete. The cutting valve comprises a gate that is slidable within a cavity in the valve block from an open position to a closing and cutting position. The valve having seats mounted on opposite sides of the gate and having sealing surfaces that engage the gate when the gate is in the closed position. Shear elements are connected to and carried by each of the valve seats and are capable of axial movement relative the valve seats in response to movement of the gate from the open position to the closed position.

The seats and shearing arrangement on the upper and lower side of the gate are described to operate in the same manner. The publication does not take into consideration that the gate have a considerably weight will pull the gate downward in the cutting process.

There are not described any adjustment caused by the gravity of the gate valve in the publication. This indicates that it is not obvious for a skilled person to compensate for the forces acting on the upper and lower seat so that the allowed travelling distance for the upper seat and lower seat are substantially equal.

The arrangement of the shear elements in the publication are also more complex than the cutting elements in the present invention. In the present invention the cutting elements forms an integrated part of the gate.

A demand exists for a cutting valve which minimizes the clearance between the upper seat and the gate in the cutting position, and which increase the shearing efficiency of the valve and thereby ensures that the wire is cut off, i.e. severed, completely.

SUMMARY OF THE INVENTION

The invention provides a cutting valve comprising a valve block, a gate, which is slidably within a cavity in the valve block from an open position to a closing and cutting position, an upper seat arranged in an upper part of the valve between the valve block and the gate, and a lower seat arranged in a lower part of the valve between the valve block and the gate, The valve further comprises an upper resilient member arranged between the upper seat and a lower resilient member arranged between the valve block and the lower seat. The cutting valve being distinctive in that the combination of height of upper seat, and lower seat, resilient member and any spacers on the lower side of the gate is selected so that an allowed travelling distance for the upper seat towards the valve block and an allowed travelling distance for the lower seat towards the valve block, are substantially equal.

The gate of the cutting valve has a considerable weight and the gravity will pull the gate downward when the wire are cut off in the valve because of the necessary clearance between the valve and the seats. This will cause an uneven cut at the upper and lower part of the gate. To compensate for the gravity and allow a equal travelling distance of the upper and lower seats towards the valve block, there is arranged resilient member, spacers or different heights of the seat The term "cutting position of the valve" is defined as the position of the valve when the gate is subject to the gravity acting to pull the gate towards the lower seat.

Preferable embodiments of the cutting valve are defined in the dependent claim, to which reference are made.

In this context the term "equal slits" means that the vertical clearance between each of the seats (the outer part with a pier) and the gate, at the upper part of the cavity and the lower part of the cavity, is of equal magnitude. When the slits are equal it minimizes the risk of uneven cutting and dragging thin strands of the wire in between the gate and the seat.

One embodiment of the invention is to implement a resilient member, for instance a spring, with a higher elasticity modulus, resulting in a greater force on the lower seat as a compensation for the weight of the valve components in the vertical stack. This higher modulus will effectively positioning the gate in the center of the valve cavity. This allows the seats to retract into their pockets an equal distance during the cutting sequence and thereby leaving an equal cutting slit on each side of the gate, which increases the cutting efficiency and minimizes the risk of dragging in the thin strands.

Another advantage with equal slits is that the cutting action is more efficient, especially for thin braided wires with tough and thin strands.

Another embodiment of the invention is to implement distance elements, such as shims, at the lower part of the seat and use mainly equal resilient members i.e. stiffness of the springs, between the distance elements and the seat.

Yet another preferred embodiment of the invention is to arrange smaller seat pockets on the lower side of the valve or stronger springs at the upper side of the valve.

BRIEF DESCRIPTION OF THE DRAWINGS

FIG. 3 shows the valve according to the invention in a closing position when the gate are moving in a direction X.

FIGS. 4 and 5 shows the cutting sequence of the valve.

FIG. 6-11 is schematic views of different preferred embodiments of the present invention, wherein FIG. 6a is a principle drawing of a prior art gate valve illustrated by the forces acting on the gate valve.

FIG. 6b is a principle drawing of a gate valve according to the present invention illustrated by the forces acting on the gate valve.

FIG. 7 is a sectional view of a preferred embodiment of a cutting valve according to the present invention with stronger springs on the lower seat.

FIG. 8 is a sectional view of another preferred embodiment according to the present invention with shim or added material in the lower valve block.

FIG. 9 is a sectional view of yet another preferred embodiment according to the present invention with smaller spring pocket on the lower seat.

FIG. 10 is a sectional view of yet another preferred embodiment according to the present invention with shims added between the lower seat and spring.

FIG. 11 is a sectional view of yet another preferred embodiment according to the present invention with larger spring pocket arrangement in the upper seat 6a.

DETAILED DESCRIPTION OF THE INVENTION

Figure 1:
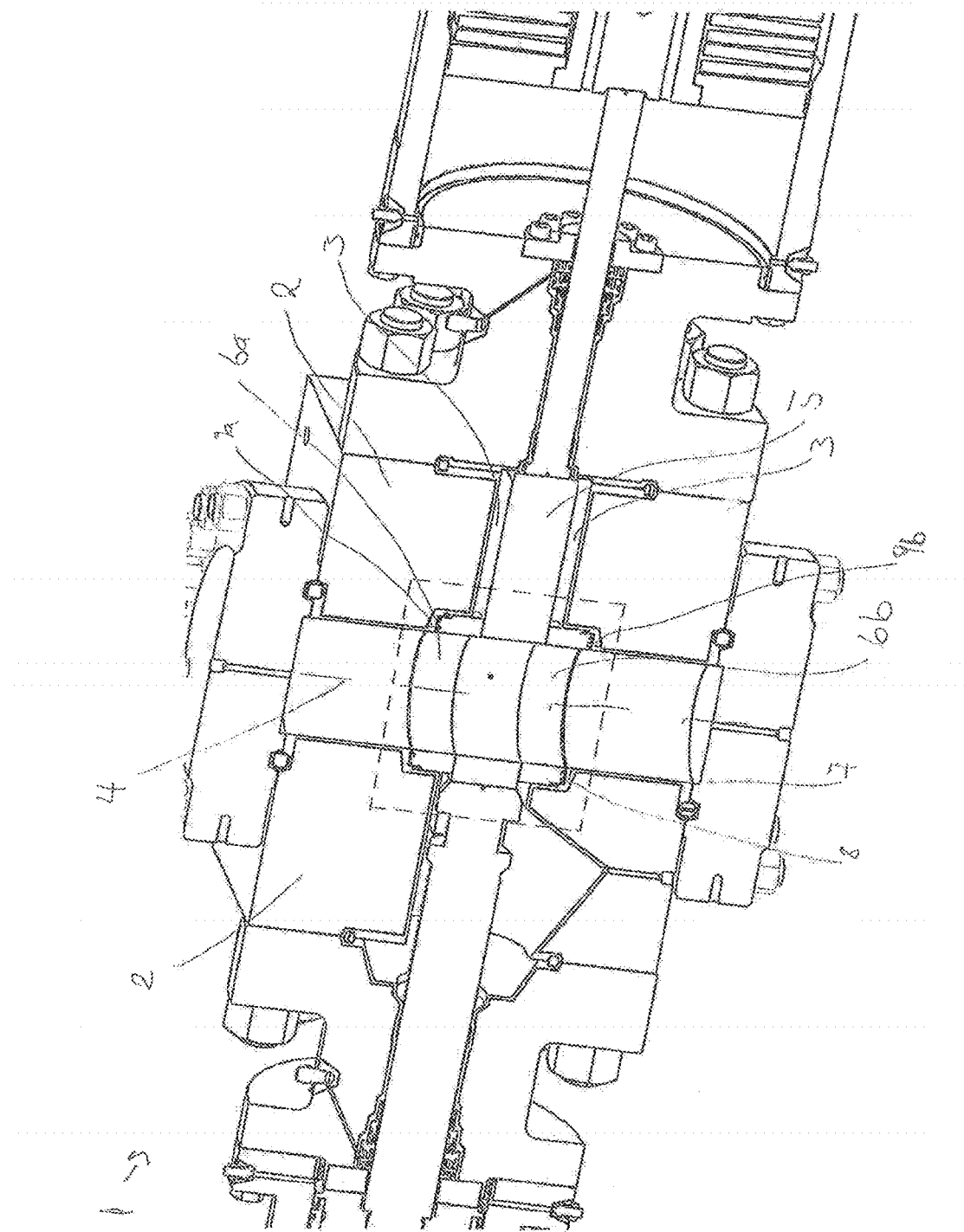
FIG. 1 is an isometric view of a cutting valve.

With reference to FIG. 1 an isometric view of a cutting valve 1 is shown. The figure shows a cross section of a valve body 1, the valve comprising an annular valve block 2 housing a cavity 3 therein and a passage 4 formed through the body 1 that intersects the cavity 3. A gate 5 is shown within the cavity 3 and is selectively slidable within the cavity 3. Annular seats 6a, 6b are shown coaxially disposed in the passage 4, each having an end extending into the cavity 3, the inner end is extending towards the gate 5 and the outer end is extending towards the valve blocks 2 of the valve body 1. The outer end of the seat 6a, 6b comprising two vertically divided parts. One part with a resilient member 8, for instance a spring in a spring pocket attached between the valve block 2 and the seats 6a, 6b and a pier 7 that protrudes further out and are abutting the valve block 2 when the seats 6a, 6b are pressed against the valve block 2 (This is better shown in FIG. 2-5).

The seats 6a, 6b and the gate 5 requires a vertical clearance in-between each other to allow for thermal expansion, component tolerances etc. At the upper part of the valve 1 there is a gap 9a between the pier 7a at the seat 6a and the valve block 2.

At the lower part of the valve 1, there is a gap 9b between the pier 7b at the seat 6b and the valve block 2. The gap 9a, 9b defines the distance the seats 6a, 6b are allowed to move towards the valve block 2.

Figure 2:
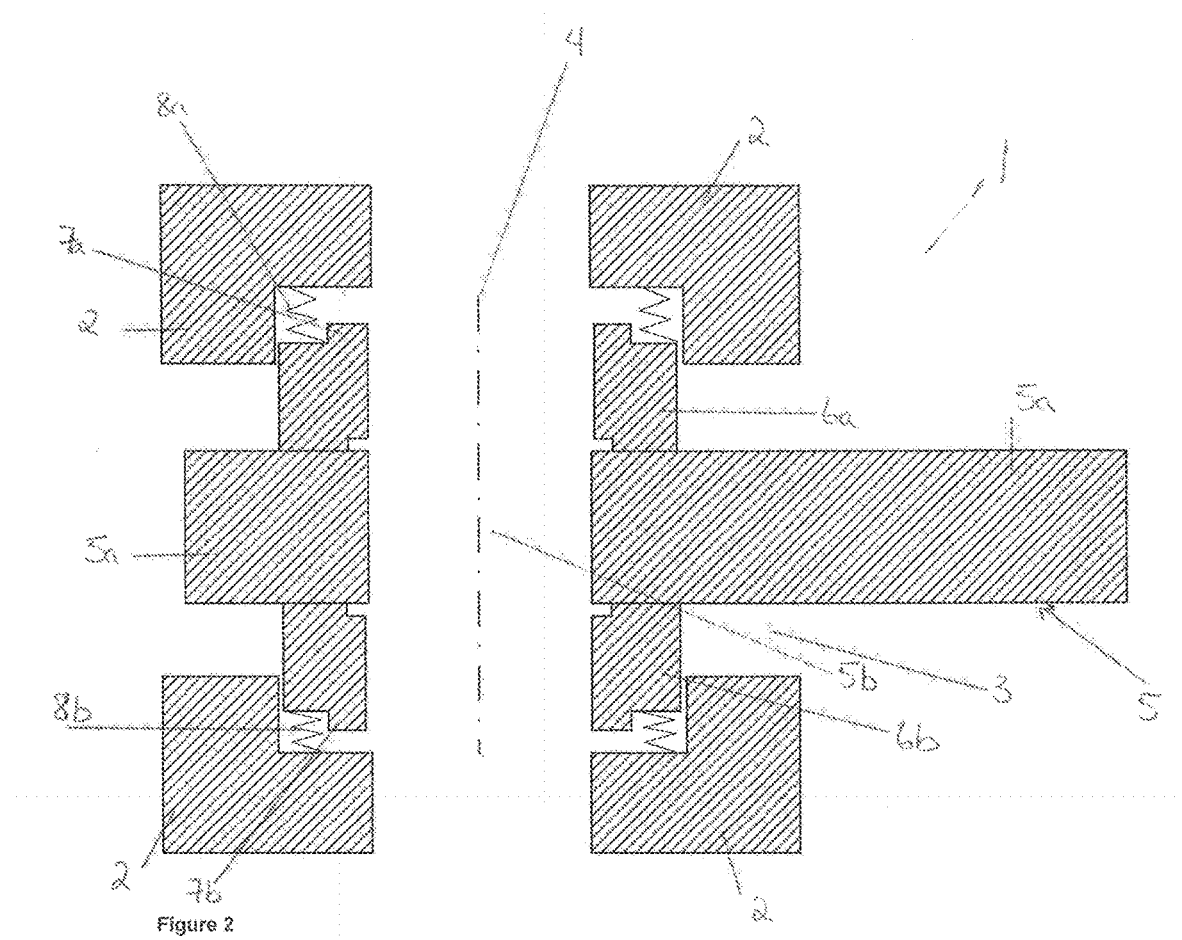
FIG. 2-FIG. 5 are schematic views of a normal cutting sequence without use of the invention, wherein FIG. 2. shows the valve according to the invention an open position.

With reference to FIG. 2 a sectional view of the normal cutting valve without use of the invention is shown in an open position.

The gate 5 comprises a solid portion 5a and an opening or hollow part 5b. The hollow part 5b has the same diameter as the opening in the passage 4.

While in open position the valve seats 6a, 6b is in contact with the solid portion 5a of the gate 5 along an annular surface that circumscribes the opening 5b.

In order to keep an initial contact pressure between the gate 5 and the seats 6a, 6b despite the gap 9a, 9b of the pier 7a, 7b and the valve block, the seats 6a, 6b are spring loaded with a resilient member such as springs 8a, 8b arranged as previously mentioned at the outer part of the seats 6a, 6b. The resilient members are arranged with one end against the valve block 2 and the other end respectively against the seats 6a, 6b. The resilient members 8a, 8b are of equal type and have equal force for the biasing of each of the seats 6a, 6b.

The gap 9a between the pier 7a at the upper seat 6a and the valve block 2 is larger than the gap 9b between the pier 7b at the lower seat 6b and the valve block 2 because of the weight of the gate 5 is pulled down by gravity.

Figure 3:
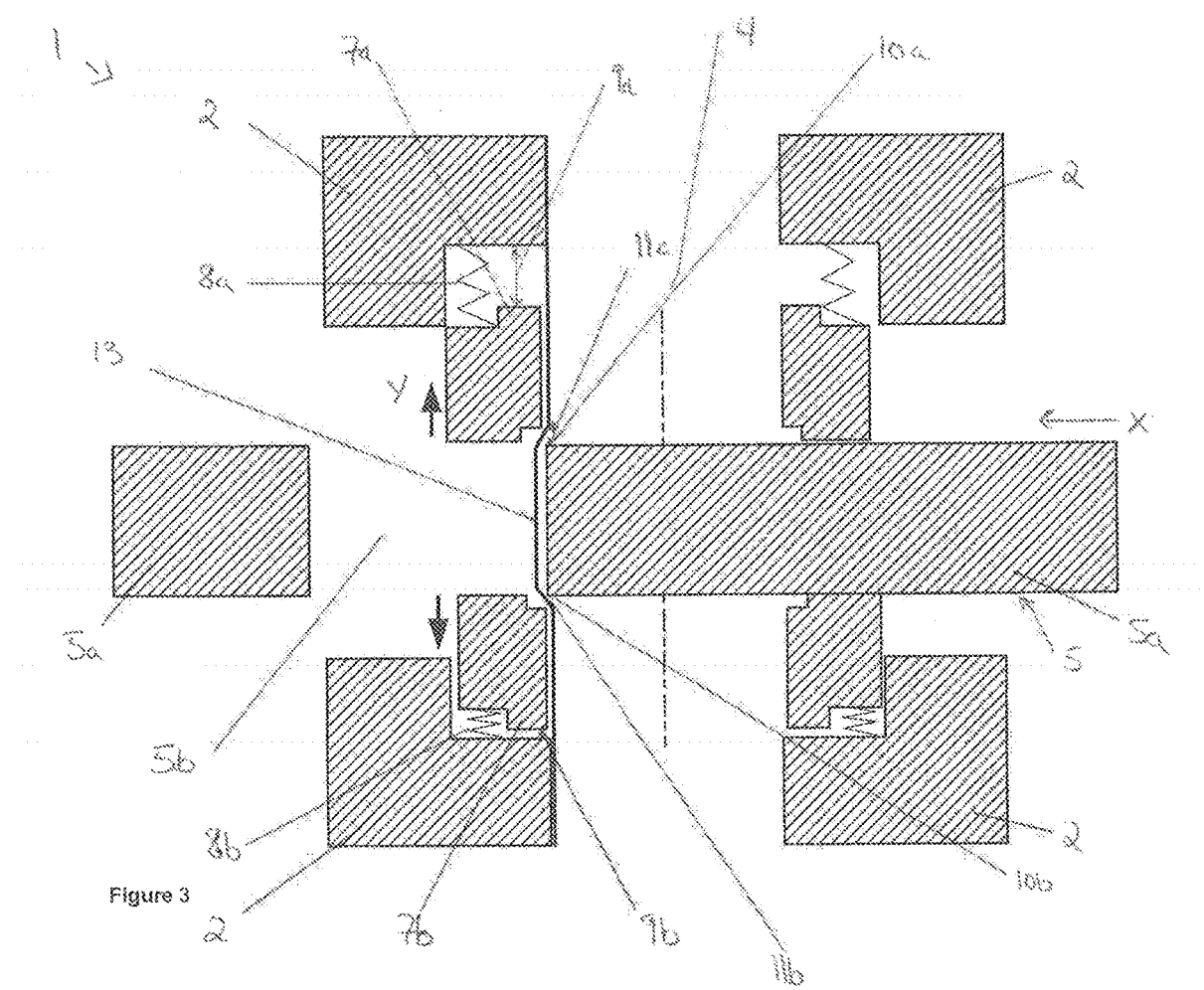

With reference to FIG. 3, a side sectional view of the cutting valve 1 of FIG. 2 is shown in a closing position. When the valve 1 is closed, the gate 5 is slidably moved in the direction of the arrow X in the horizontal direction, impinging a cutting specimen such as a wire 13.

Figure 4:
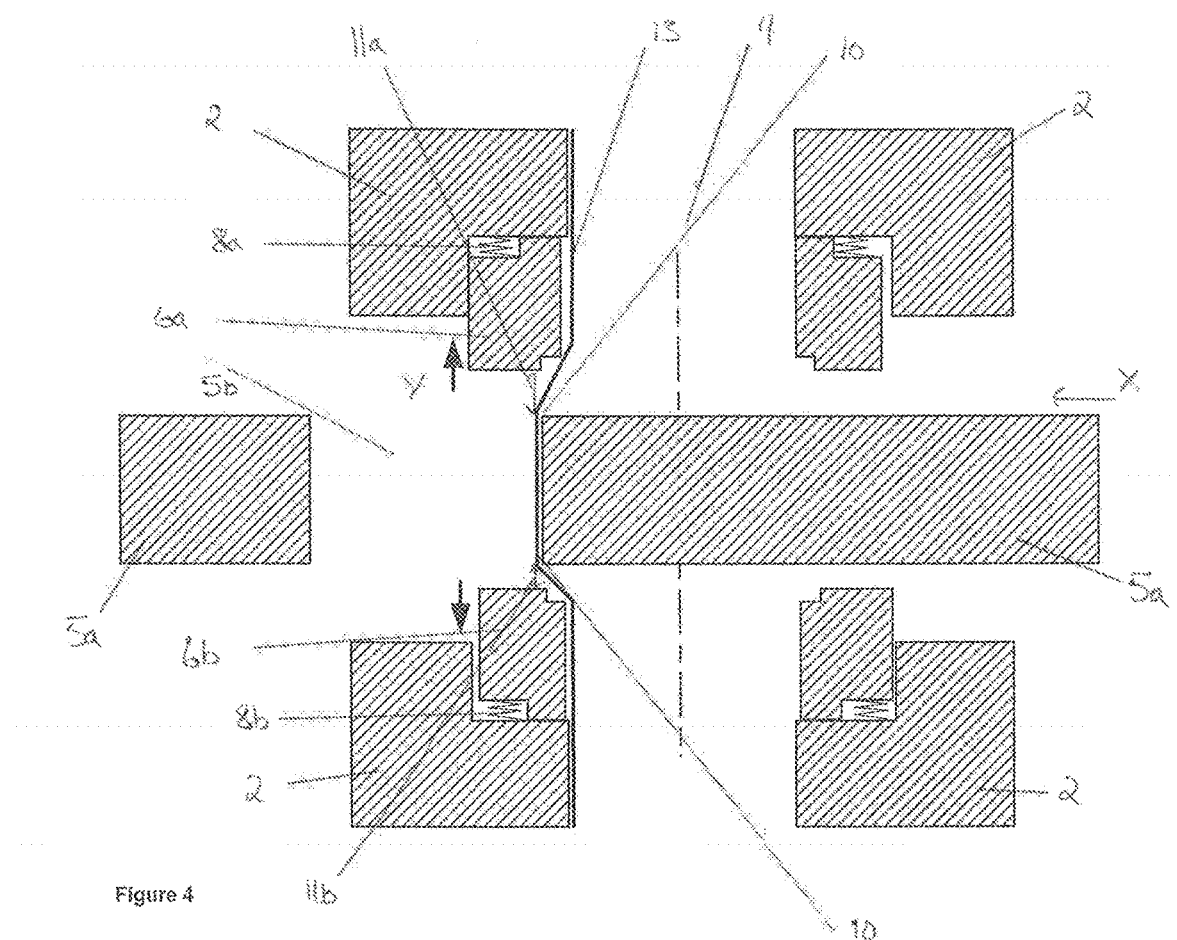
Figure 5:
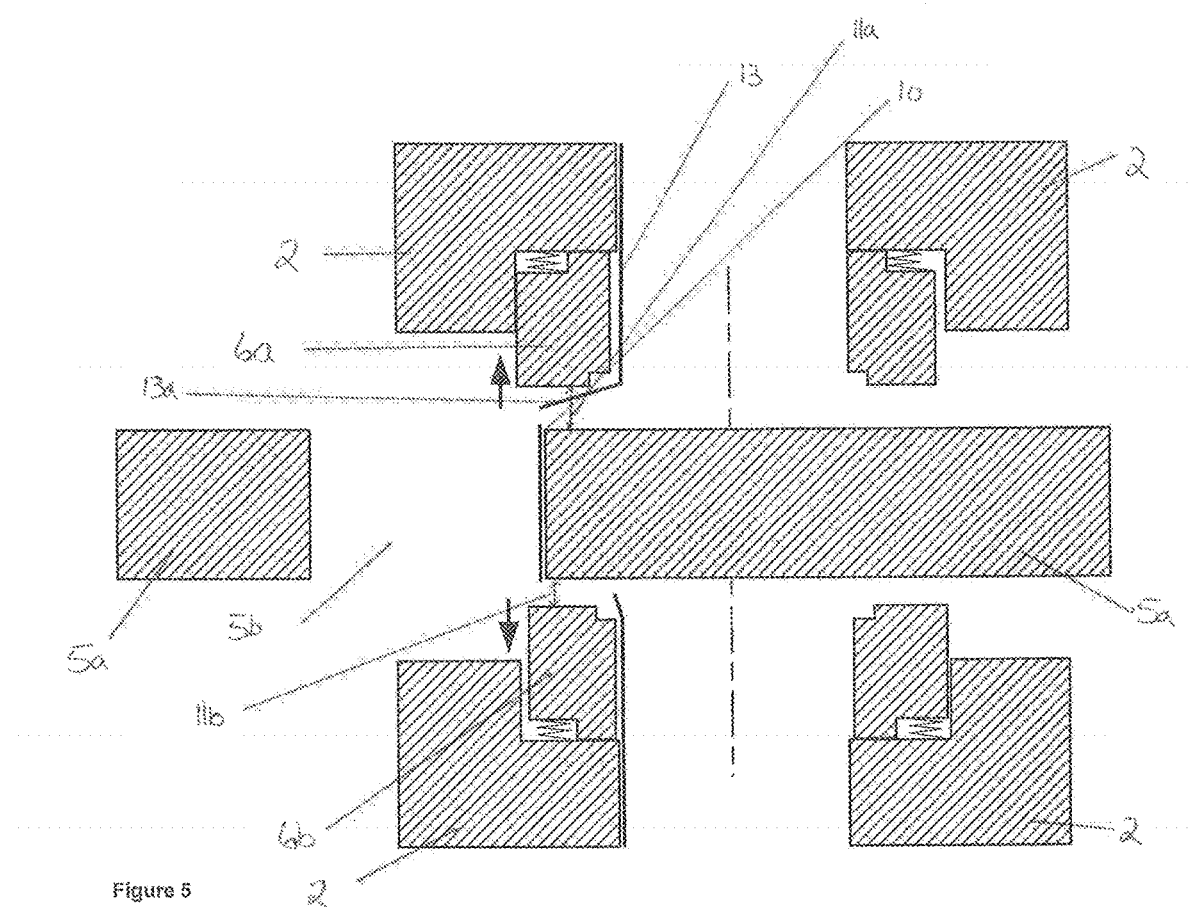

With reference to FIGS. 4 and 5 the cutting position of the valve of FIG. 1 is shown. During the cutting sequence, the seats 6a, 6b are pushed away from the gate 5 into valve seat pockets as a result of the cutting force that is created when the wire 13 is squeezed between the gate 5 and the seats 6a, 6b. The seats 6a, 6b are retracted until the pier 7a at the upper seat 6a and the pier 7b of the lower seat 6b respectively are abutting the valve block 2.

The part of the gate 5 pushing against the wire 13 has cutting edges 10a, 10b. The wires 13 will be cut in an upper cutting slit 11a between the upper seat 6a and the cutting edge 10a of the upper part of the gate 5, and in a lower cutting slit 11b defined between the lower seat 6b and the cutting edge 10b at the lower part of the gate 5.

The upper seat 6a is allowed to move a longer distance than the lower seat 6b because the gap 9a (se FIG. 3) is larger than the gap 9b (see FIG. 3). This in turn will lead to forming the larger upper slit 11a than the lower slit 11b. At the upper slit 11a wire strands 13a may be dragged in between the seat 6a and the gate 5 because of the large slit. The wires strands 13a that are dragged in between the seat 6a and gate 5 may prevent a proper sealing of the valve 1 after cutting.

The principle of the problem with existing cutting valve and a solution to the problem are illustrated in principle in FIGS. 6a and 6b. FIG. 6a shows a prior art cutting valve 1 with the gate 5 and seats 6a, 6b resting against the gate 5. The resilient member 8a is attached to the seat 6a and the resilient members 8b are attached to the seat 6b. In current designs as in FIG. 6a, the forces of the springs Fs are equal, but opposite at both sides of the gate 5. Additionally gravity acts on the gate 5, this force Fn will pull the gate 5 downward to a position where a centerline 13 along the center of the gate 5 is below a centerline 12 of the valve body 1.

If a resilient member 21a for instance a spring acting on the upper seat 6a and a resilient member 21b for instance a spring acting on the lower seat 6b are asymmetrical that is having a different spring loading. The lower spring acts with a force Fs+Fn, this will compensate for the gravitational weight of the gate, leaving the centerline of the gate 13 substantially equal with the centerline 12 of the valve body 12. This will lead to an evenly distribution of the gap 9a, 9b (FIG. 3) at the upper side and the lower side of the valve and thus also an substantially equal upper slit 11a, and lower slit 11b.

With reference to FIG. 7, a sectional view of the closing and cutting valve of a preferred embodiment of the present invention is shown. The figure shows a cutting valve 1 similar to the cutting valve described in FIG. 1-5, comprising a valve block 2, a cavity 3, passage 4, gate 5 and seats 6a, 6b with piers 7a, 7b arranged as previously described. The gate having cutting edges 10a, 10b at the upper and lower part of the gate 5. A resilient member 18b, for instance a spring, is attached between the lower seat 6b and the valve block 2 beside the piers 7b. This resilient member 18b is stronger than a resilient member 18a attached between the upper seat 6a and the valve block 2.

This uneven strength of the springs 18a, 18b, if chosen correctly, is causing an evenly distributed valve clearance on the upper side and lower side of the valve. This means that an upper gap 19a between the upper pier 7a and the valve block 2, and a lower gap 19b between the lower pier 7b and the valve block 2, are equal. The clearance between the gate 5 and the upper seat 6a are also equal to the clearance between the gate 5 and the lower seat 6b.

The lower spring 18b has a higher spring resistance than the upper spring 18a as a compensation for the weight of the valve components, especially the weight of the gate 5, in the vertical stack. The seats 6a, 6b are allowed to retract into their pockets an equal distance during the cutting sequence and thereby leaving an equal cutting slit on both sides of the gate 5, which minimizes the risk of dragging thin strands into the slits. (The location of the split are shown in FIG. 3 by the reference numeral 11a, 11b). As an alternative to a stronger spring 18b at the lower side of the valve, a weaker spring 18a is arranged at the upper side of the valve 1. This is an embodiment of the present invention.

Figure 8:
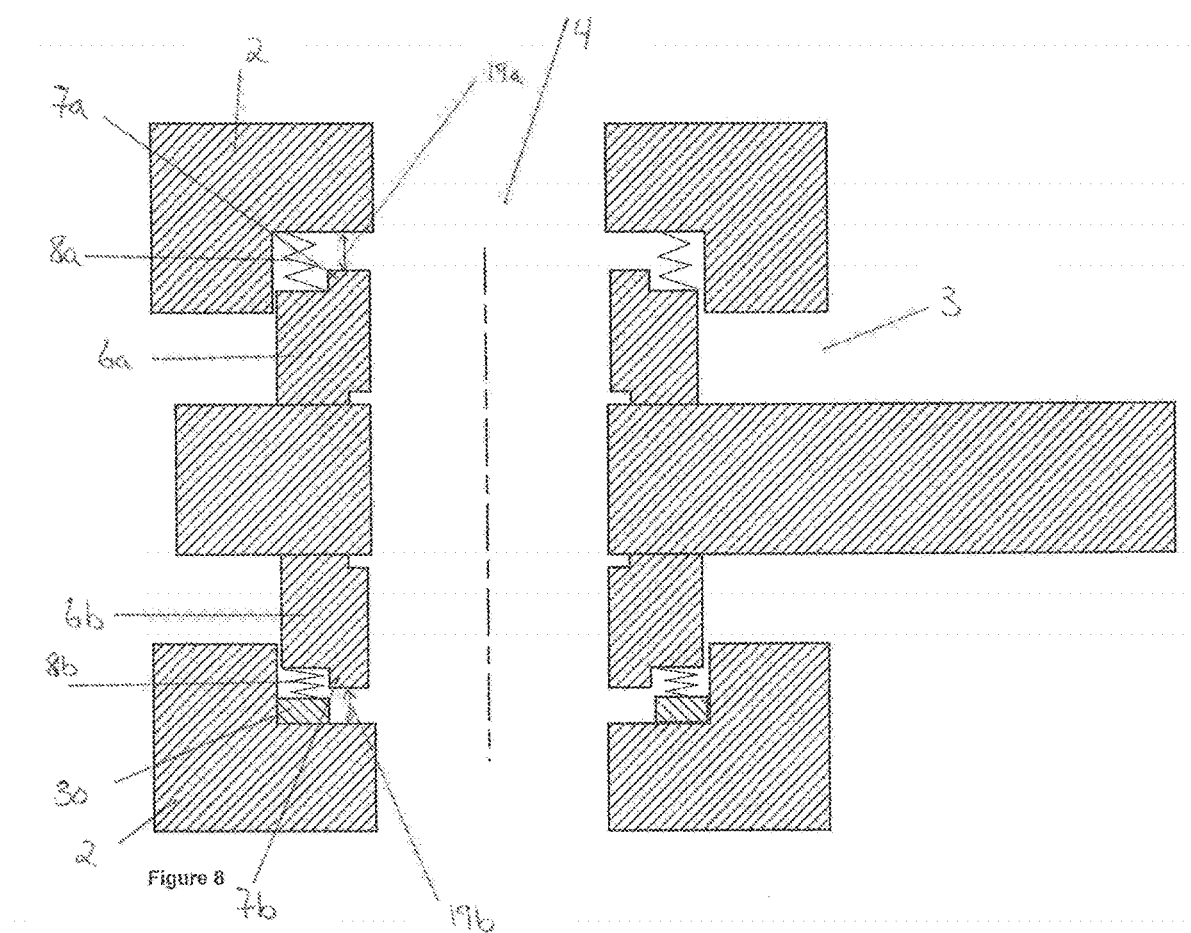

With reference to FIG. 8 a sectional view of the cutting valve according to a preferred embodiment of the present invention is shown. The figure shows a cutting valve similar to the cutting valve described in FIG. 1-5, comprising a valve block 2, a cavity 3, a passage 4, a gate 5, seats 6a, 6b with piers 7a, 7b and resilient members 8a, 8b. The upper resilient member 8a is equal to the lower resilient member 8b. In addition one or more shims 30 or other added material are arranged in the lower part of the valve block 2, the shim or shims, 30 is arranged between the lower resilient member 8b and the valve block 2.

Compression of the lower resilient member 8b are influenced by the thickness of the shim(s) 30. The shim(s) 30 have a suitable thickness maintaining evenly distributed valve clearance on the upper side and lower side of the valve and thus an equal upper gap 19a and a lower gap 19b. As an alternative to shims 30 at the lower side of the valve it is an embodiment of the present invention to remove part of the valve block 2 where the upper resilient member 8a is arranged in the valve block 2, to obtain the same result.

Figure 9:
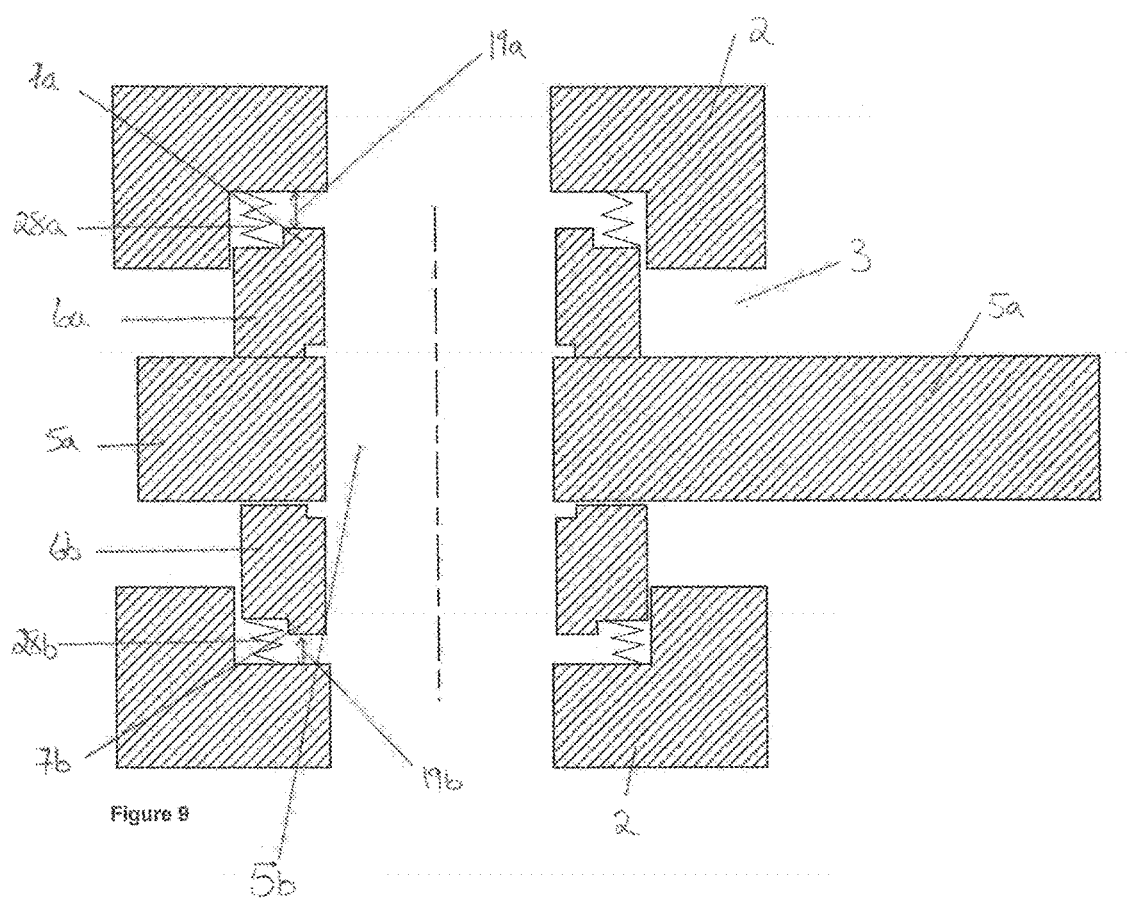

With reference now to FIG. 9 a sectional view of the cutting valve according to another preferred embodiment of the present invention is shown. The figure shows a cutting valve similar to the cutting valve described in FIG. 1-5, comprising a valve block 2, a cavity 3, passage 4, gate 5 and seats 6a, 6b with piers 7a, 7b. In this embodiment of the invention a spring pocket 28b attached to the lower seat 6b is smaller than the spring pocket 28a attached to the upper seat 6a. This leads to a larger spring pocket in the upper seat 6a. This leads to an evenly distributed valve clearance on the upper side and lower side of the valve and thus an equal upper gap 19a and a lower gap 19b, as previously described in the other embodiments of the invention.

Figure 10:
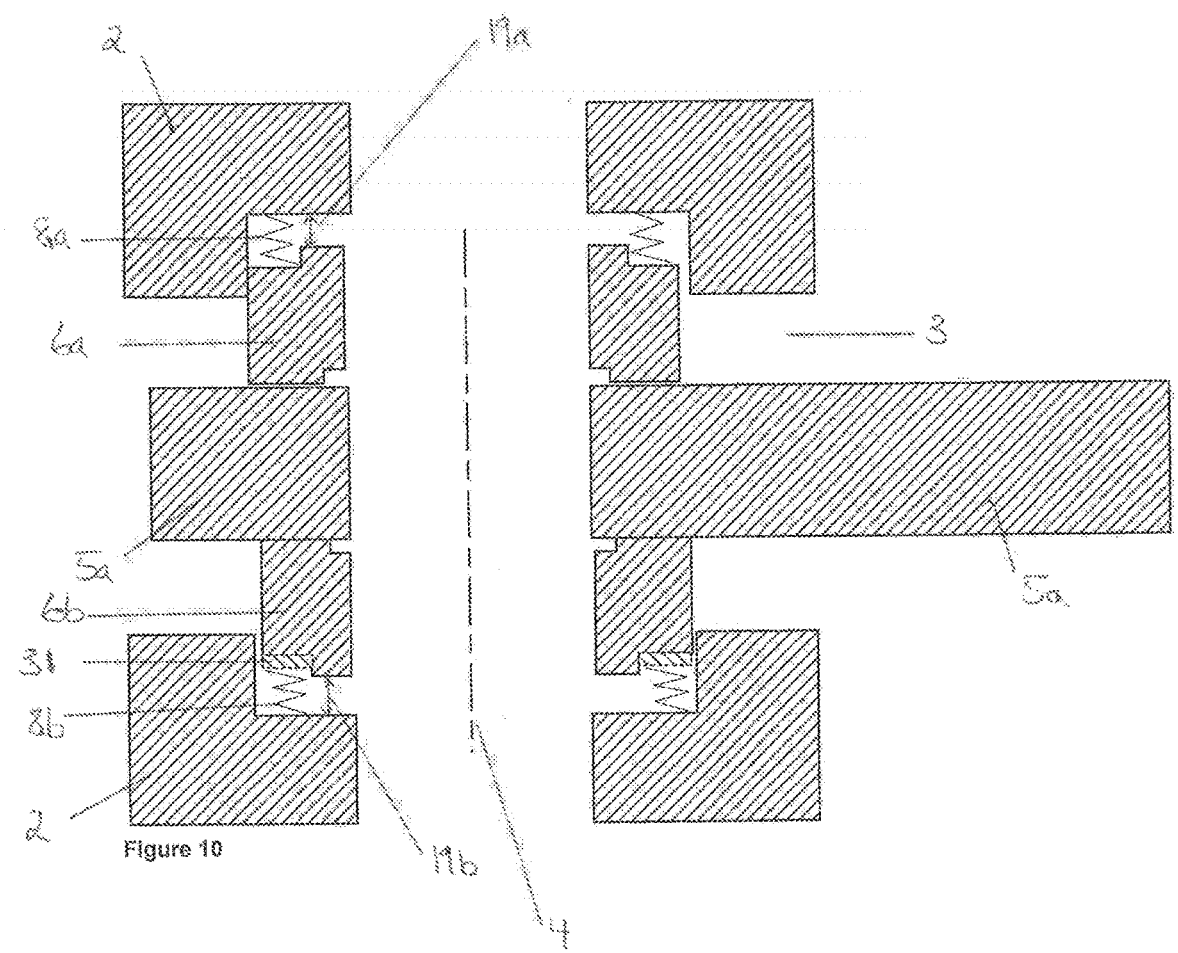

With reference to FIG. 10 a sectional view of the cutting valve according to yet another preferred embodiment of the present invention is shown. In this embodiment a shim or shims 31 are added between the lower seat 6b and resilient member 8b. The resilient members 8a, 8b at the upper part and lower part of the valve are equal, like the embodiment described in FIG. 8. This leads also to a more compressed lower resilient member 8b and an evenly distributed valve clearance on the upper side and lower side of the valve, resulting an equal upper gap 19a and a lower gap 19b.

As an alternative to shims 31 at the lower side of the valve it is an embodiment of the present invention to remove part of the upper seat 6a where the upper resilient member 8a is arranged to the seat 6a to obtain the same result.

With reference now to FIG. 11 a sectional view of the cutting valve according to yet another possible embodiment of the present invention is shown. The figure shows a cutting valve similar to the cutting valve described in FIG. 1-5, comprising a valve block 2, a cavity 3, a passage 4, a gate 5 and seats 6a, 6b with piers 7a, 7b. In this embodiment of the invention there are arranged stronger resilient members such as springs 38a at the upper seat 6a, i.e. the spring pockets in the upper seat 6a are larger than at the spring pockets at the lower seat 6b. A suitable relationship between the sizes (depths) of the upper and lower spring pockets leads to the same results as the previous embodiments: an evenly distributed valve clearance on the upper side and lower side of the valve, and thus an equal upper gap 19a and a lower gap 19b.

The cutting valve of the invention can comprise any feature as here described or illustrated, in any operative combination, each such operative combination is an embodiment of the present invention.

The invention claimed is:

1. A combined gate and cutting valve comprising:
   a valve block and a gate, the gate being defined by a single plate and being slidable horizontally within a cavity in the valve block from an open position to a closed and cutting position, said gate having an upper cutting edge and a lower cutting edge formed on opposite faces of the single plate, the upper cutting edge and the lower cutting edge being arranged around an opening formed in said gate;
   an upper seat arranged in an upper part of the valve between the valve block and the gate;
   a lower seat arranged in a lower part of the valve between the valve block and the gate;
   an upper resilient member arranged between the valve block and the upper seat;
   a lower resilient member arranged between the valve block and the lower seat; and
   wherein a combination of a height of the upper seat and a height of the upper resilient member, and a combination of a height of the lower seat and a height of the lower resilient member is selected to compensate for gravity forces of the gate so that a travelling distance for the upper seat towards the valve block and a travelling distance for the lower seat towards the valve block are equal.

2. The cutting valve according to claim 1, wherein the resilient members comprising at least one upper spring, and at least one lower spring, said upper spring attached to the upper seat and said lower spring attached to the lower seat, the lower spring having a higher elasticity module than the upper spring.

3. The cutting valve according to claim 1, comprising at least one shim arranged in the lower part of the valve block.

4. The cutting valve according to claim 3, wherein the at least one shim is arranged between the lower resilient member and the valve block.

5. The cutting valve according to claim 3, wherein the at least one shim is arranged between the lower seat and the lower resilient member.

6. The cutting valve according to claim 1, wherein a first spring pocket attached to the lower seat is of a smaller depth than a second spring pocket attached to the upper seat.

* * * * *